(12) United States Patent
Speldrich et al.

(10) Patent No.: US 8,695,417 B2
(45) Date of Patent: Apr. 15, 2014

(54) FLOW SENSOR WITH ENHANCED FLOW RANGE CAPABILITY

(75) Inventors: Jamie Speldrich, Freeport, IL (US); Lamar Floyd Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 415 days.

(21) Appl. No.: 13/018,017

(22) Filed: Jan. 31, 2011

(65) Prior Publication Data

US 2012/0192643 A1 Aug. 2, 2012

(51) Int. Cl.
*G01F 1/68* (2006.01)

(52) U.S. Cl.
USPC ...................................................... 73/204.22

(58) Field of Classification Search
None
See application file for complete search history.

(56) References Cited

U.S. PATENT DOCUMENTS

| | | |
|---|---|---|
| 2,746,296 A | 5/1956 | Stover |
| 3,216,249 A | 11/1965 | Joel |
| 3,410,287 A | 11/1968 | Van Der Heyden et al. |
| 3,433,069 A | 3/1969 | Trageser |
| 3,484,732 A | 12/1969 | Postma |
| 3,559,482 A | 2/1971 | Baker et al. |
| 3,640,277 A | 2/1972 | Adelberg |
| 3,785,206 A | 1/1974 | Benson et al. |
| 3,830,104 A | 8/1974 | Gau |
| 3,838,598 A | 10/1974 | Tompkins |
| 3,886,799 A | 6/1975 | Billette et al. |
| 3,895,531 A | 7/1975 | Lambert |
| 3,931,736 A * | 1/1976 | Olmstead .................. 73/204.19 |
| 3,952,577 A | 4/1976 | Hayes et al. |
| 3,970,841 A | 7/1976 | Green |

(Continued)

FOREIGN PATENT DOCUMENTS

| | | |
|---|---|---|
| DE | 3905746 | 8/1990 |
| DE | 102004019521 | 11/2005 |

(Continued)

OTHER PUBLICATIONS

Bodycote, "Honeywell Sensing and Control, Sensiron SDP610 Competitive Teardown Analysis," 15 pages, Feb. 19, 2009.

(Continued)

*Primary Examiner* — Harshad R Patel
(74) *Attorney, Agent, or Firm* — Seager Tufte & Wickhem LLC.

(57) ABSTRACT

Flow sensor assemblies having increased flow range capabilities are disclosed. In one illustrative embodiment, a flow sensor assembly includes a housing with an inlet flow port, an outlet flow port, and a fluid channel extending between the inlet flow port and the outlet flow port. One or more partitions are provided in the fluid channel of the housing to define two or more fluid sub-passages. A flow sensor, for sensing a measure related to a flow rate of a fluid flowing through the fluid channel, is positioned in one of the two or more fluid sub-passages. In some cases, the cross-sectional area of each of the two or more fluid sub-passages may be substantially the same, but this is not required. The housing may be formed from a single molded part defining the inlet and outlet flow ports, at least a portion of the fluid channel, and one or more of the partitions. In this case, a top cover may be provided and mounted to the housing to define the remaining portion of the fluid channel, if desired.

18 Claims, 9 Drawing Sheets

(56) References Cited

U.S. PATENT DOCUMENTS

| | | | |
|---|---|---|---|
| 3,981,074 A | 9/1976 | Yamamoto et al. | |
| 4,008,619 A | 2/1977 | Alcaide et al. | |
| 4,030,357 A | 6/1977 | Wemyss | |
| 4,041,757 A | 8/1977 | Baker et al. | |
| 4,098,133 A | 7/1978 | Frische et al. | |
| 4,100,801 A | 7/1978 | LeMay | |
| 4,326,214 A | 4/1982 | Trueblood | |
| 4,343,194 A | 8/1982 | Dehart et al. | |
| 4,411,292 A | 10/1983 | Schiller | |
| 4,418,723 A | 12/1983 | Koni et al. | |
| 4,444,060 A | 4/1984 | Yamamoto | |
| RE31,570 E | 5/1984 | Drexel | |
| 4,478,076 A | 10/1984 | Bohrer | |
| 4,478,077 A | 10/1984 | Bohrer et al. | |
| 4,481,828 A | 11/1984 | Cheng | |
| 4,494,405 A | 1/1985 | Oosuga et al. | |
| 4,501,144 A | 2/1985 | Higashi et al. | |
| 4,546,655 A | 10/1985 | Victor | |
| 4,574,640 A | 3/1986 | Krechmery | |
| 4,581,928 A | 4/1986 | Johnson | |
| 4,581,945 A | 4/1986 | Rusz | |
| 4,618,397 A | 10/1986 | Shimizu et al. | |
| 4,648,270 A | 3/1987 | Johnson et al. | |
| 4,651,564 A | 3/1987 | Johnson et al. | |
| 4,653,321 A | 3/1987 | Cunningham et al. | |
| 4,655,088 A | 4/1987 | Adams | |
| 4,668,102 A | 5/1987 | Mott | |
| 4,672,997 A | 6/1987 | Landis et al. | |
| 4,677,850 A * | 7/1987 | Miura et al. | 73/204.15 |
| 4,677,858 A | 7/1987 | Ohnhaus | |
| 4,683,159 A | 7/1987 | Bohrer et al. | |
| 4,691,566 A | 9/1987 | Aine | |
| 4,696,194 A | 9/1987 | Taylor | |
| 4,768,386 A | 9/1988 | Taddeo | |
| 4,790,181 A | 12/1988 | Aine | |
| 4,800,754 A | 1/1989 | Korpi | |
| 4,817,022 A | 3/1989 | Jornod et al. | |
| 4,825,704 A | 5/1989 | Aoshima et al. | |
| 4,829,818 A | 5/1989 | Bohrer | |
| 4,839,038 A | 6/1989 | Mclain, II | |
| 4,845,649 A | 7/1989 | Eckardt et al. | |
| 4,856,328 A | 8/1989 | Johnson | |
| 4,900,242 A | 2/1990 | Maus et al. | |
| 4,945,762 A | 8/1990 | Adamic, Jr. | |
| 4,961,344 A | 10/1990 | Rodder | |
| 4,976,283 A | 12/1990 | Wildfang et al. | |
| 4,986,127 A | 1/1991 | Shimada et al. | |
| 5,000,478 A | 3/1991 | Kerastas | |
| 5,014,552 A | 5/1991 | Kamiunten et al. | |
| 5,042,307 A | 8/1991 | Kato | |
| 5,050,429 A | 9/1991 | Nishimoto et al. | |
| 5,063,786 A | 11/1991 | Sanderson et al. | |
| 5,063,787 A | 11/1991 | Khuzai et al. | |
| 5,081,866 A | 1/1992 | Ochiai et al. | |
| 5,088,329 A | 2/1992 | Sahagen | |
| 5,088,332 A | 2/1992 | Merilainen et al. | |
| 5,089,979 A | 2/1992 | McEachern et al. | |
| 5,099,965 A | 3/1992 | Lehnert et al. | |
| 5,107,441 A | 4/1992 | Decker | |
| 5,137,026 A | 8/1992 | Waterson et al. | |
| 5,144,843 A | 9/1992 | Tamura et al. | |
| 5,155,061 A | 10/1992 | O'Connor et al. | |
| 5,161,410 A | 11/1992 | Davey et al. | |
| 5,187,985 A | 2/1993 | Nelson | |
| 5,193,393 A | 3/1993 | Czarnocki | |
| 5,220,830 A | 6/1993 | Bonne | |
| 5,231,877 A | 8/1993 | Henderson | |
| 5,249,462 A | 10/1993 | Bonne | |
| 5,253,517 A | 10/1993 | Molin et al. | |
| 5,295,394 A | 3/1994 | Suzuki | |
| 5,303,584 A | 4/1994 | Ogasawara et al. | |
| 5,319,973 A | 6/1994 | Crayton et al. | |
| 5,321,638 A | 6/1994 | Witney | |
| 5,332,005 A | 7/1994 | Baan | |
| 5,341,841 A | 8/1994 | Schaefer | |
| 5,341,848 A | 8/1994 | Laws | |
| 5,357,793 A | 10/1994 | Jouwsma | |
| 5,377,128 A | 12/1994 | McBean | |
| 5,379,650 A | 1/1995 | Kofoed et al. | |
| 5,385,046 A | 1/1995 | Yamakawa et al. | |
| 5,398,194 A | 3/1995 | Brosh et al. | |
| 5,400,973 A | 3/1995 | Cohen | |
| 5,404,753 A | 4/1995 | Hecht et al. | |
| 5,453,628 A | 9/1995 | Hartsell et al. | |
| 5,459,351 A | 10/1995 | Bender | |
| 5,460,050 A | 10/1995 | Miyano | |
| 5,481,925 A | 1/1996 | Woodbury | |
| 5,507,171 A | 4/1996 | Mattes et al. | |
| 5,528,452 A | 6/1996 | Ko | |
| 5,535,135 A | 7/1996 | Bush et al. | |
| 5,535,633 A | 7/1996 | Kofoed et al. | |
| 5,537,870 A | 7/1996 | Zurek et al. | |
| 5,544,529 A | 8/1996 | Mitani et al. | |
| 5,551,304 A | 9/1996 | Baskett | |
| 5,578,962 A | 11/1996 | Rastegar | |
| 5,581,027 A | 12/1996 | Juntunen | |
| 5,583,295 A | 12/1996 | Nagase et al. | |
| 5,585,311 A | 12/1996 | Ko | |
| 5,609,303 A | 3/1997 | Cohen | |
| 5,634,592 A | 6/1997 | Campau | |
| 5,641,911 A | 6/1997 | Ryhanen | |
| 5,672,832 A | 9/1997 | Cucci et al. | |
| 5,717,145 A | 2/1998 | Yasuhara et al. | |
| 5,735,267 A | 4/1998 | Tobia | |
| 5,736,651 A | 4/1998 | Bowers | |
| 5,741,968 A | 4/1998 | Arai | |
| 5,747,705 A | 5/1998 | Herb et al. | |
| 5,750,892 A | 5/1998 | Huang et al. | |
| 5,763,787 A | 6/1998 | Gravel et al. | |
| 5,770,883 A | 6/1998 | Mizuno et al. | |
| 5,781,291 A | 7/1998 | So et al. | |
| 5,789,660 A | 8/1998 | Kofoed et al. | |
| 5,792,958 A | 8/1998 | Speldrich | |
| 5,808,210 A | 9/1998 | Herb et al. | |
| 5,817,950 A | 10/1998 | Wiklund et al. | |
| 5,829,685 A | 11/1998 | Cohen | |
| 5,844,135 A | 12/1998 | Brammer et al. | |
| 5,861,561 A | 1/1999 | Van Cleve et al. | |
| 5,866,824 A | 2/1999 | Schieber | |
| 5,870,482 A | 2/1999 | Loeppert et al. | |
| 5,942,694 A | 8/1999 | Robins et al. | |
| 6,023,978 A | 2/2000 | Dauenhauer et al. | |
| 6,035,721 A | 3/2000 | Krisch | |
| 6,044,716 A | 4/2000 | Yamamoto | |
| 6,047,244 A | 4/2000 | Rud, Jr. | |
| 6,112,598 A | 9/2000 | Tenerz et al. | |
| 6,119,730 A | 9/2000 | McMillan | |
| 6,128,963 A | 10/2000 | Bromster | |
| 6,131,463 A | 10/2000 | Morris | |
| 6,142,014 A | 11/2000 | Rilling | |
| 6,150,681 A | 11/2000 | Allen | |
| 6,164,143 A | 12/2000 | Evans | |
| 6,167,763 B1 | 1/2001 | Tenerz et al. | |
| 6,169,965 B1 | 1/2001 | Kubisiak et al. | |
| 6,177,637 B1 | 1/2001 | Evans | |
| 6,223,593 B1 | 5/2001 | Kubisiak et al. | |
| 6,229,190 B1 | 5/2001 | Bryzek et al. | |
| 6,234,016 B1 | 5/2001 | Bonne et al. | |
| 6,247,495 B1 | 6/2001 | Yamamoto et al. | |
| 6,263,740 B1 | 7/2001 | Sridhar et al. | |
| 6,308,553 B1 | 10/2001 | Bonne et al. | |
| 6,312,389 B1 | 11/2001 | Kofoed et al. | |
| 6,322,247 B1 | 11/2001 | Bonne et al. | |
| 6,445,053 B1 | 9/2002 | Cho | |
| 6,450,005 B1 | 9/2002 | Bentley | |
| 6,452,427 B1 | 9/2002 | Ko et al. | |
| 6,502,459 B1 | 1/2003 | Bonne et al. | |
| 6,526,822 B1 * | 3/2003 | Maeda et al. | 73/204.21 |
| 6,527,385 B2 | 3/2003 | Koitabashi et al. | |
| 6,528,340 B2 | 3/2003 | Haji-Sheikh et al. | |
| 6,542,594 B1 | 4/2003 | LeBoulzec | |
| 6,543,449 B1 | 4/2003 | Woodring et al. | |
| 6,553,808 B2 | 4/2003 | Bonne et al. | |
| 6,561,021 B2 | 5/2003 | Uramachi et al. | |

(56) References Cited

U.S. PATENT DOCUMENTS

| | | |
|---|---|---|
| 6,579,087 B1 | 6/2003 | Vrolijk |
| 6,591,674 B2 | 7/2003 | Gehman et al. |
| 6,615,668 B2 | 9/2003 | Toyoda et al. |
| 6,621,138 B1 | 9/2003 | Alter |
| 6,642,594 B2 | 11/2003 | Kurtz |
| 6,653,959 B1 | 11/2003 | Song |
| 6,655,207 B1 | 12/2003 | Speldrich et al. |
| 6,681,623 B2 | 1/2004 | Bonne et al. |
| 6,684,711 B2 | 2/2004 | Wang |
| 6,715,339 B2 | 4/2004 | Bonne et al. |
| 6,724,202 B2 | 4/2004 | Tanizawa |
| 6,742,399 B2 | 6/2004 | Kunz et al. |
| 6,761,165 B2 | 7/2004 | Strickland, Jr. |
| 6,769,299 B2 | 8/2004 | Forster et al. |
| 6,779,393 B1 | 8/2004 | Muller et al. |
| 6,779,395 B2 | 8/2004 | Hornung et al. |
| 6,826,966 B1 | 12/2004 | Karbassi et al. |
| 6,871,534 B1 | 3/2005 | Hamada et al. |
| 6,871,535 B2 | 3/2005 | Blakley et al. |
| 6,871,537 B1 | 3/2005 | Gehman et al. |
| 6,886,401 B2 | 5/2005 | Ito et al. |
| 6,901,795 B2 | 6/2005 | Naguib et al. |
| 6,904,799 B2 | 6/2005 | Cohen et al. |
| 6,904,907 B2 | 6/2005 | Speldrich et al. |
| 6,907,787 B2 | 6/2005 | Cook et al. |
| 6,915,682 B2 | 7/2005 | Renninger et al. |
| 6,923,069 B1 | 8/2005 | Stewart |
| 6,928,865 B2 | 8/2005 | Ito et al. |
| 6,945,118 B2 | 9/2005 | Maitland, Jr. et al. |
| 6,957,586 B2 | 10/2005 | Sprague |
| 6,958,523 B2 | 10/2005 | Babcock et al. |
| 7,000,298 B2 | 2/2006 | Cook et al. |
| 7,000,612 B2 | 2/2006 | Jafari et al. |
| 7,024,937 B2 | 4/2006 | James |
| 7,028,560 B2 | 4/2006 | Castillon Levano |
| 7,032,463 B2 | 4/2006 | Misholi et al. |
| 7,036,366 B2 | 5/2006 | Emmert et al. |
| 7,043,978 B2 | 5/2006 | Goka et al. |
| 7,059,184 B2 | 6/2006 | Kanouda et al. |
| 7,085,628 B2 | 8/2006 | Ohmi et al. |
| 7,100,454 B2 | 9/2006 | Hasunuma |
| 7,107,834 B2 | 9/2006 | Meneghini et al. |
| 7,117,747 B2 | 10/2006 | Borzabadi et al. |
| 7,121,139 B2 | 10/2006 | Shajii et al. |
| 7,146,860 B2 | 12/2006 | Yeh et al. |
| 7,146,864 B2 | 12/2006 | Sullivan et al. |
| 7,185,538 B2 | 3/2007 | Hager et al. |
| 7,204,139 B2 * | 4/2007 | Takayama ............... 73/204.26 |
| 7,218,093 B2 | 5/2007 | Cirkel et al. |
| 7,239,957 B1 | 7/2007 | Sweet et al. |
| 7,243,541 B1 | 7/2007 | Bey et al. |
| 7,258,003 B2 | 8/2007 | Padmanabhan et al. |
| 7,258,016 B2 | 8/2007 | Maitland, Jr. et al. |
| 7,262,724 B2 | 8/2007 | Hughes et al. |
| 7,263,876 B2 | 9/2007 | Yamazaki et al. |
| 7,266,999 B2 | 9/2007 | Ricks |
| 7,278,309 B2 | 10/2007 | Dmytriw et al. |
| 7,278,326 B2 | 10/2007 | Kobayashi et al. |
| 7,305,877 B2 | 12/2007 | Beyrich et al. |
| 7,318,351 B2 | 1/2008 | Cobianu et al. |
| 7,337,677 B2 | 3/2008 | Mizohata |
| 7,343,812 B2 | 3/2008 | Stewart et al. |
| 7,343,823 B2 | 3/2008 | Speldrich |
| 7,347,098 B2 | 3/2008 | Kurtz et al. |
| 7,347,785 B2 | 3/2008 | Worman, Jr. et al. |
| 7,353,719 B2 | 4/2008 | Hiura et al. |
| 7,373,819 B2 | 5/2008 | Engler et al. |
| 7,377,177 B1 | 5/2008 | Lamb et al. |
| 7,386,166 B2 | 6/2008 | Curry et al. |
| 7,430,918 B2 | 10/2008 | Selvan et al. |
| 7,454,984 B1 | 11/2008 | Ross et al. |
| 7,458,274 B2 | 12/2008 | Lamb et al. |
| 7,464,611 B2 | 12/2008 | Matter et al. |
| 7,469,598 B2 | 12/2008 | Shkarlet et al. |
| 7,472,580 B2 | 1/2009 | Lyons et al. |
| 7,479,255 B2 | 1/2009 | Otani et al. |
| 7,493,823 B2 | 2/2009 | Stewart et al. |
| 7,509,855 B2 * | 3/2009 | Garvin ............... 73/202 |
| 7,513,149 B1 | 4/2009 | Ricks |
| 7,516,761 B2 | 4/2009 | Setescak |
| 7,520,051 B2 | 4/2009 | Becke et al. |
| 7,530,274 B2 | 5/2009 | Kurtz et al. |
| 7,549,332 B2 | 6/2009 | Yamashita et al. |
| 7,568,383 B2 | 8/2009 | Colvin et al. |
| 7,603,898 B2 | 10/2009 | Speldrich |
| 7,631,562 B1 | 12/2009 | Speldrich |
| 7,635,077 B2 | 12/2009 | Schubert |
| 7,647,835 B2 | 1/2010 | Speldrich |
| 7,653,494 B2 | 1/2010 | Neacsu et al. |
| 7,654,157 B2 | 2/2010 | Speldrich |
| 7,661,303 B2 | 2/2010 | Kohno et al. |
| 7,685,874 B2 | 3/2010 | Nakano et al. |
| 7,698,938 B2 | 4/2010 | Inagaki et al. |
| 7,698,958 B2 | 4/2010 | Matter et al. |
| 7,704,774 B2 | 4/2010 | Mayer et al. |
| 7,730,793 B2 | 6/2010 | Speldrich |
| 7,757,553 B2 | 7/2010 | Meier et al. |
| 7,759,945 B2 | 7/2010 | Wade |
| 7,762,138 B2 | 7/2010 | Zdeblick et al. |
| 7,769,557 B2 | 8/2010 | Bey et al. |
| 7,775,105 B2 | 8/2010 | Khadikar et al. |
| 7,793,410 B2 | 9/2010 | Padmanabhan et al. |
| 7,805,986 B2 | 10/2010 | Colvin et al. |
| 7,823,456 B2 | 11/2010 | Krog et al. |
| 7,832,269 B2 | 11/2010 | Bey, Jr. et al. |
| 7,878,980 B2 | 2/2011 | Ricciardelli |
| 7,891,238 B2 | 2/2011 | Becke et al. |
| 7,892,488 B2 | 2/2011 | Speldrich et al. |
| 7,918,136 B2 | 4/2011 | Muchow et al. |
| 7,924,189 B2 | 4/2011 | Sayers |
| 7,950,286 B2 | 5/2011 | Bentley |
| 7,995,124 B2 | 8/2011 | Dai |
| 8,010,322 B2 | 8/2011 | Dmytriw et al. |
| 8,024,146 B2 | 9/2011 | Bey et al. |
| 8,113,046 B2 | 2/2012 | Speldrich et al. |
| 8,158,438 B2 | 4/2012 | Leiner et al. |
| 8,175,835 B2 | 5/2012 | Dmytriw et al. |
| 8,397,586 B2 | 3/2013 | Sorenson et al. |
| 2001/0052263 A1 * | 12/2001 | Setescak ............... 73/204.21 |
| 2002/0078744 A1 | 6/2002 | Gehman et al. |
| 2002/0166376 A1 * | 11/2002 | Kohmura et al. ........ 73/204.26 |
| 2003/0062045 A1 | 4/2003 | Woodring et al. |
| 2004/0118200 A1 | 6/2004 | Hornung et al. |
| 2004/0163461 A1 | 8/2004 | Ito et al. |
| 2004/0177703 A1 | 9/2004 | Schumacher et al. |
| 2005/0016534 A1 | 1/2005 | Ost |
| 2005/0039809 A1 | 2/2005 | Speldrich |
| 2005/0235757 A1 | 10/2005 | De Jonge et al. |
| 2005/0247106 A1 | 11/2005 | Speldrich et al. |
| 2005/0247107 A1 | 11/2005 | Speldrich et al. |
| 2006/0017207 A1 | 1/2006 | Bechtold et al. |
| 2006/0101908 A1 | 5/2006 | Meneghini et al. |
| 2006/0201247 A1 | 9/2006 | Speldrich et al. |
| 2006/0225488 A1 | 10/2006 | Speldrich |
| 2007/0000330 A1 | 1/2007 | Tysoe et al. |
| 2007/0171589 A1 | 7/2007 | Otake |
| 2007/0176010 A1 | 8/2007 | Figi et al. |
| 2007/0197922 A1 | 8/2007 | Bradley et al. |
| 2007/0238215 A1 | 10/2007 | Stewart et al. |
| 2007/0295068 A1 | 12/2007 | Kozawa et al. |
| 2008/0163683 A1 | 7/2008 | Becke et al. |
| 2008/0202929 A1 | 8/2008 | Chapples et al. |
| 2009/0067684 A1 | 3/2009 | Mainguet |
| 2009/0188303 A1 * | 7/2009 | Ooishi ............... 73/40.7 |
| 2009/0265144 A1 | 10/2009 | Speldrich |
| 2010/0013165 A1 | 1/2010 | Speldrich et al. |
| 2010/0101332 A1 | 4/2010 | Speldrich |
| 2010/0154559 A1 | 6/2010 | Speldrich |
| 2010/0269583 A1 | 10/2010 | Jasnie |
| 2010/0305465 A1 | 12/2010 | Ricks et al. |
| 2011/0179879 A1 | 7/2011 | Bentley |
| 2011/0226052 A1 | 9/2011 | Speldrich et al. |
| 2011/0226053 A1 | 9/2011 | Sorenson et al. |
| 2011/0247411 A1 | 10/2011 | Speldrich |

(56) References Cited

U.S. PATENT DOCUMENTS

| | | |
|---|---|---|
| 2012/0035866 A1 | 2/2012 | Qasimi et al. |
| 2012/0125114 A1 | 5/2012 | Stewart et al. |
| 2012/0186336 A1 | 7/2012 | Speldrich et al. |

FOREIGN PATENT DOCUMENTS

| | | |
|---|---|---|
| EP | 0094497 | 11/1983 |
| EP | 0255056 | 2/1988 |
| EP | 0857957 | 8/1998 |
| EP | 1655123 | 5/2006 |
| EP | 1691175 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| FR | 377743 | 3/1907 |
| GB | 2123564 | 2/1984 |
| JP | 49120131 | 11/1974 |
| JP | 57115873 | 7/1982 |
| JP | 58221119 | 12/1983 |
| JP | 63065679 | 3/1988 |
| JP | 63215929 | 9/1988 |
| JP | 3099230 | 4/1991 |
| JP | 4069521 | 3/1992 |
| JP | 7083713 | 3/1995 |
| JP | 10239130 | 9/1998 |
| JP | 10307047 | 11/1998 |
| JP | 2004012406 | 1/2004 |
| JP | 2004304052 | 10/2004 |
| JP | 2006197538 | 7/2006 |
| WO | WO9221940 | 12/1992 |
| WO | WO9315373 | 8/1993 |
| WO | WO9517651 | 6/1995 |
| WO | 0111322 | 2/2001 |
| WO | 0161282 | 8/2001 |
| WO | 0198736 | 12/2001 |
| WO | 2006131531 | 12/2006 |
| WO | WO2007095528 | 8/2007 |
| WO | 2007137978 | 12/2007 |
| WO | WO2008070603 | 6/2008 |

OTHER PUBLICATIONS

Search Report for Corresponding Application No. 12153191.7-1234 Dated Jun. 6, 2012.
Honeywell, "Airflow Sensors Line Guide," 6 pages, Apr. 2010.
Honeywell, "Airflow, Force, and Pressure Sensors," Product Range Guide, 20 pages, Apr. 2010.
Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors," 1 page, prior to Mar. 22, 2010.
Honeywell, "Sensing and Control Interactive Catalog," 4 pages, prior to Mar. 22, 2010.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.
Bodycote, "Competitive Teardown Analysis of Sensirion EMI," Bodycote Testing Group, 24 pages, Oct. 15, 2007.
U.S. Appl. No. 13/018,037, filed Jan. 31, 2011.
Honeywell, "Airflow, Force and Pressure Sensors," Product Range Guide, 20 pages, Mar. 2011.
Honeywell, "Airflow Sensors Line Guide," 6 pages, Nov. 2010.
Honeywell, "AWM43600V, Issue No. 4," 1 page, Jul. 29, 1996.
Honeywell, "AWM43600V, Part No. SS12177," 1 page, Jul. 10, 1998.
"Schematic Cross-Section for AWM43600," 1 page, prior to Jan. 31, 2011.
U.S. Appl. No. 13/361,764, filed Jan. 30, 2012.
All Sensors, "BDS Series Pressure Sensor," 4 pages, prior to Sep. 6, 2011.
Bitko et al., "Improving the MEMS Pressure Sensor," Sensors, pp. 1-12, Jul. 2000.
Celerity, Inc., "Dual Range Transducer Display," 2 pages, 2006.
Search Report for EP Application Serial No. 09178993.3 dated Dec. 16, 2011.
Search Report for EP Application Serial No. 11190426.4 dated Aug. 5, 2012.
Search Report for EP Application Serial No. 12153191.7 dated Jun. 6, 2012.
Search Report for GB Application Serial No. 1103997.1, date of search Jul. 11, 2011.
U.S. Appl. No. 13/673,685, filed Nov. 9, 2012.
U.S. Appl. No. 13/863,188 filed Apr. 15, 2013.
Honeywell, "DCXL-DS Series, SURSENSE Ultra Low Silicon Pressure Sensors," 4 pages, May 2010.
Martel Electronics, "PPC-3300 Precision Dual Range Pressure Calibrator," 2 pages, 2002.
Schultz, "Interfacing Semiconductor Pressure Sensors to Microcomputers," Freescale Semiconductor, AN1318 Rev 2, 12 pages, May 2005.
Silicon Microstructures Inc., "Low Pressure Transducer Fully Temperature Compensated and Calibrated Dual In-Line Package," SM5651-SM5652 Low Pressure Constant Current/Voltage Dip, 2 pages, 2001-2002.
Zentrum Mikroelektronik Dresden AG, "ZMD31050/ZMD31150 Advanced Sensor Signal Conditioner," Application Notes, Electronic Offset Compensation, Rev. 1.01, 4 pages, Apr. 13, 2010.
Zentrum Mikroelektronik Dresden AG, "ZSC31050 Advanced Differential Sensor Signal Conditioner," Functional Description, Rev. 1.08, 50 pages, Jul. 29, 2010.

* cited by examiner

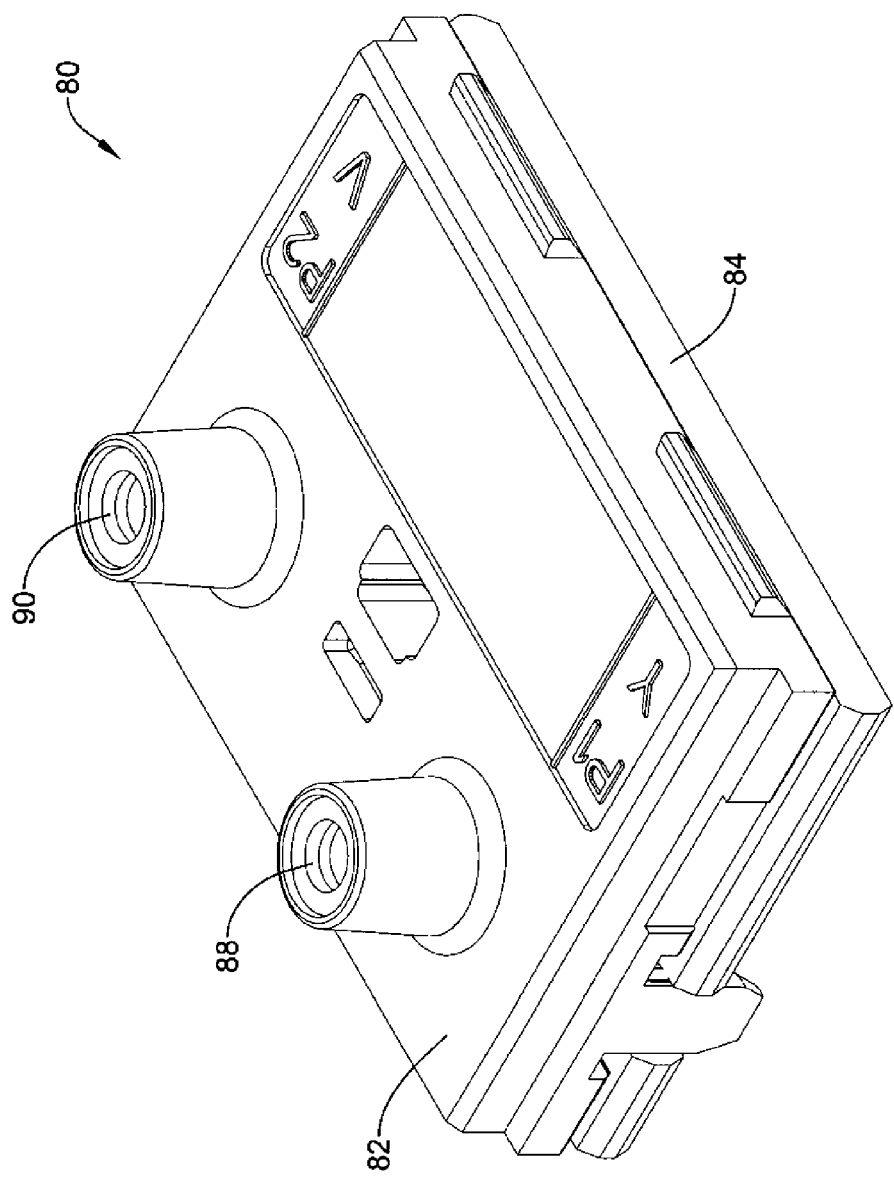

FLOW SENSOR WITH ENHANCED FLOW RANGE CAPABILITY

RELATED APPLICATION

This application is related to U.S. application Ser. No. 13/018,037, entitled "FLOW SENSOR ASSEMBLY WITH INTEGRAL BYPASS CHANNEL", filed on even date herewith, which is hereby incorporated by reference.

FIELD

The present disclosure relates generally to flow sensors, and more particularly, to flow sensor that are configured to sense mass volumetric flow passing through a flow channel.

BACKGROUND

Flow sensors are often used to sense the flow rate of a fluid (e.g. gas or liquid) traveling through a fluid channel. Such flow sensors are commonly used in a wide variety of applications including, for example, medical applications, flight control applications, industrial process applications, combustion control applications, weather monitoring applications, as well as many others. In some instances, the mass volumetric flow rate of the flow sensor may be limited because the flow sensor may become saturated when exposed to higher mass volumetric flow rates. This can be undesirable in some applications.

SUMMARY

The present disclosure relates generally to flow sensors, and more particularly, to methods and devices for increasing the flow rate range that can be sensed. In one illustrative embodiment, a flow sensor assembly includes a housing with an inlet flow port and an outlet flow port, and a fluid channel extending between the inlet flow port and the outlet flow port. The housing may also include one or more partitions positioned in the fluid channel that define two or more fluid sub-passages through the fluid channel. A flow sensor may be positioned in one of the two or more fluid sub-passages, and may sense a measure related to a flow rate of a fluid flowing through the corresponding fluid sub-passage. In some cases, the one or more partitions may allow the flow sensor assembly to operate at higher mass volumetric flow rates while still maintaining a stable, reliable, and repeatable output signal from the flow sensor without experiencing sensor saturation.

In some cases, the cross-sectional area of each of the two or more fluid sub-passages may be substantially the same or uniform. In some cases, the housing can be formed from a single piece molded part, and may define the inlet and outlet flow ports, at least a portion of the fluid channel, and the one or more partitions. In this case, a top cover may be provided and mounted to the housing to define, for example, the remaining portion of the fluid channel, if desired.

The preceding summary is provided to facilitate an understanding of some of the features of the present disclosure, and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which:

FIG. 9 is a bottom view of the illustrative packaged thermal flow sensor assembly of FIG. 6.

DESCRIPTION

Figure 1:
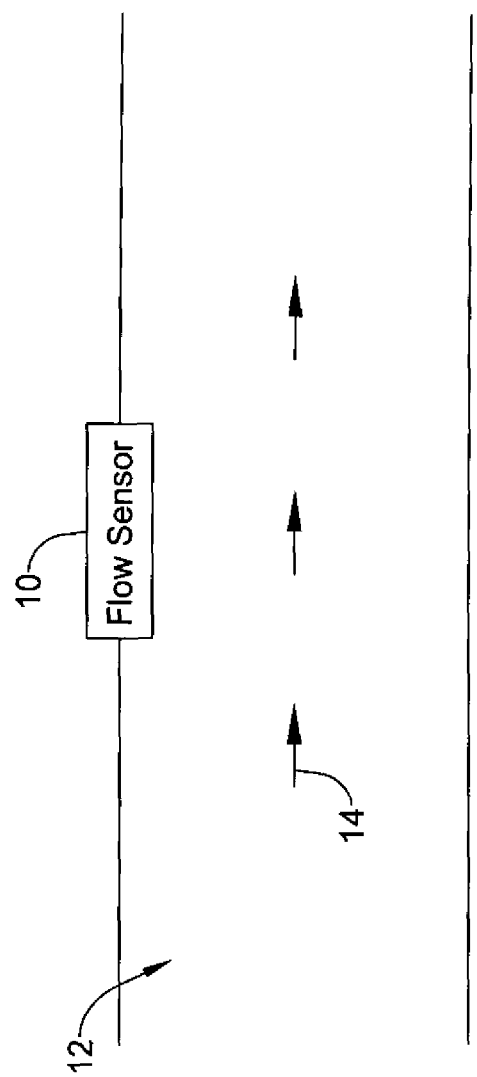
FIG. 1 is a schematic diagram of an illustrative flow sensor for measuring a fluid flow rate of a fluid passing through a fluid channel.

The following description should be read with reference to the drawings wherein like reference numerals indicate like elements throughout the several views. The description and drawings show several embodiments which are meant to be illustrative and not limiting.

FIG. 1 is a schematic diagram of an illustrative flow sensor 10 for measuring a fluid flow rate of a fluid flow 14 passing through a fluid channel 12. The term "fluid" as used herein can refer to a gas flow or a liquid flow, depending on the application. In the illustrative embodiment, the flow sensor 10 may be exposed to and/or disposed in fluid communication with the fluid channel 12 to measure one or more properties of the fluid flow 14. For example, the flow sensor 10 may measure the mass flow and/or velocity of the fluid flow 14 using one or more thermal sensors (e.g. see FIG. 2), pressure sensors, acoustical sensors, optical sensors, pitot tubes, and/or any other suitable sensor or sensor combination, as desired. In some cases, the flow sensor 10 may be a microbridge or a Microbrick™ sensor assembly (e.g. see FIG. 3) available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It must be recognized, however, that flow sensor 10 may be any suitable flow sensor, as desired.

In the illustrative example, the fluid channel 12 may experience a range of flow rates of fluid flow 14. For example, the fluid channel 12 may include a high-volume fluid flow, a mid-volume fluid flow, or a low-volume fluid flow. Example fluid flow applications can include, but are not limited to, medical applications (e.g. respirometers, ventilators, spirometers, oxygen concentrators, spectrometry applications, gas chromatography applications, sleep apnea machines, nebulizers, anesthesia delivery machines, etc.), flight control applications, industrial applications (e.g. air-to-fuel ratio, spectrometry, fuel cells, gas leak detection, gas meters, HVAC applications), combustion control applications, weather monitoring applications, as well as any other suitable fluid flow applications, as desired.

Figure 2:
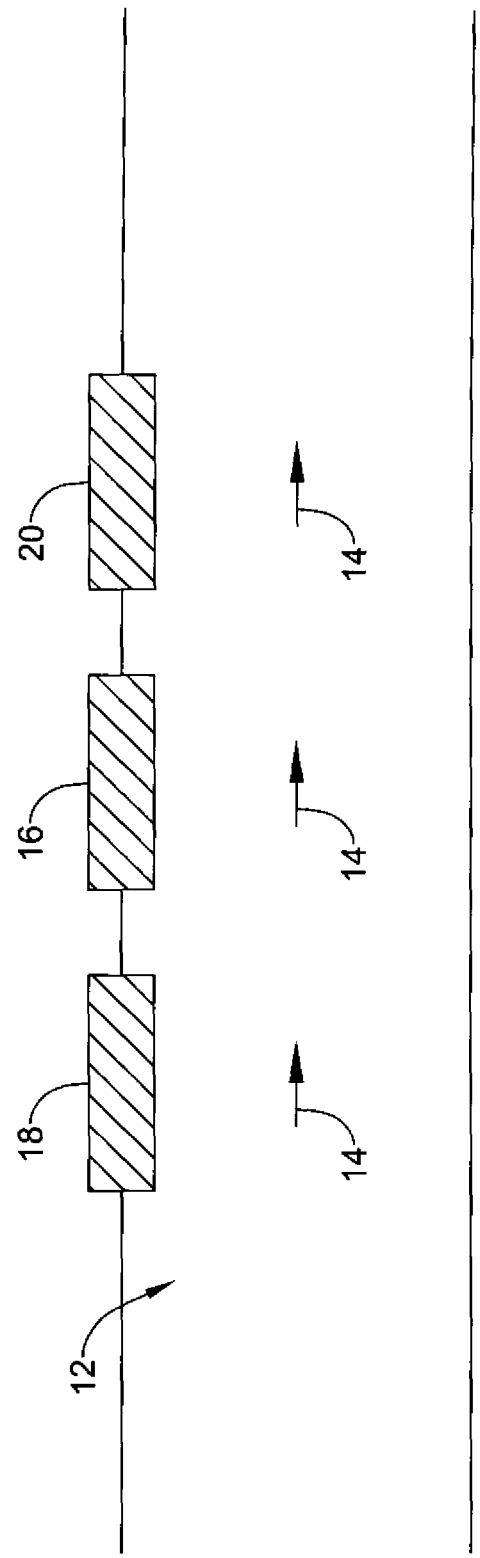
FIG. 2 is a schematic diagram of an illustrative thermal flow sensor assembly for measuring the flow rate of a fluid passing through a fluid channel.

Turning to FIG. 2, which is a schematic diagram of an illustrative thermal flow sensor assembly for measuring the flow rate of a fluid flow 14 passing through a fluid channel 12. In the illustrative embodiment of FIG. 2, the flow sensor assembly includes one or more heating elements, such as heating element 16, and one or more sensor elements 18 and 20, for sensing a flow rate of a fluid flow 14 in the fluid channel 12. As shown in FIG. 2, a first sensor element 18 can be positioned upstream of the heating element 16, and a second sensor element 20 can be positioned downstream of the heating element 16. However, this is not meant to be limiting and it is contemplated that, in some embodiments, the fluid channel 12 may be a bi-directional fluid channel such that, in some cases, the first sensor element 18 is downstream of the heating element 16 and the second sensor element 20 is upstream of the heating element 16. In some instances only one sensor element may be provided, and in other embodiments, three or more sensor elements may be provided. In some instances, both sensor elements 18 and 20 may be positioned upstream (or downstream) of the heating element 16.

In some cases, the first sensor element 18 and the second sensor element 20 may be thermally sensitive resistors that have a relatively large positive or negative temperature coefficient, such that the resistance varies with temperature. In some cases, the first and second sensing elements 18 and 20 may be thermistors. In some instances, the first sensor element 18, the second sensor element 20, and any additional sensor elements may be arranged in a Wheatstone bridge configuration, but this is not required.

In the example shown, when no fluid flow is present in the fluid channel 12 and the heating element 16 is heated to a temperature higher than the ambient temperature of the fluid in the fluid flow 14, a temperature distribution may be created and transmitted in a generally symmetrical distribution about the heating element 16 to upstream sensor element 18 and downstream sensor element 20. In this example, upstream sensor element 18 and downstream sensor element 20 may sense the same or similar temperature (e.g. within 25 percent, 10 percent, 5 percent, 1 percent, 0.001 percent, etc.). In some cases, this may produce the same or similar output voltage in the first sensor element 18 and the second sensor element 20.

When a non-zero fluid flow 14 is present in the fluid channel 12 and the heating element 16 is heated to a temperature higher than the ambient temperature of the fluid in the fluid flow 14, the symmetrical temperature distribution may be disturbed and the amount of disturbance may be related to the flow rate of the fluid flow 14 in the fluid channel 12. The flow rate of the fluid flow 14 may cause the upstream sensor element 18 to sense a relatively cooler temperature than the downstream sensor element 20. In other words, the flow rate of the fluid flow 14 may cause a temperature differential between the upstream sensor element 18 and the downstream sensor element 20 that is related to the flow rate of the fluid flow 14 in the fluid channel 12. The temperature differential between the upstream sensor element 18 and the downstream sensor element 20 may result in an output voltage differential between the upstream sensor element 18 and the downstream sensor element 20.

In another illustrative embodiment, the mass flow and/or velocity of the fluid flow 14 may be determined by providing a transient elevated temperature condition in the heating element 16, which in turn, causes a transient elevated temperature condition (e.g. heat pulse) in the fluid flow 14. When there is a non-zero flow rate in the fluid flow 14, the upstream sensor element 18 may receive a transient response later than the downstream sensor element 20. The flow rate of the fluid flow 14 can then be computed using the time lag between the upstream sensor element 18 and downstream sensor element 20, or between the time the heater is energized and when the corresponding elevated temperature condition (e.g. heat pulse) is sensed by one of the sensors, such as the downstream sensor 20.

Figure 3:
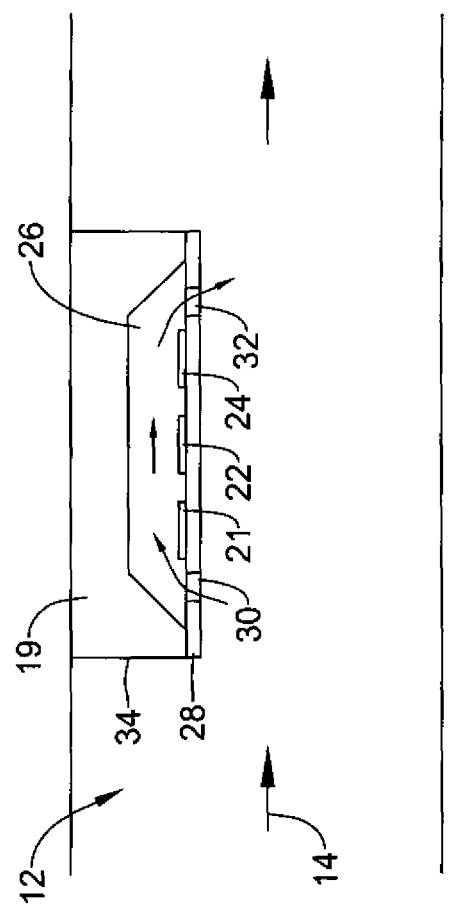
FIG. 3 is a schematic diagram of an illustrative thermal flow sensor assembly for measuring the flow rate of a fluid passing through a fluid channel.
Figure 4:
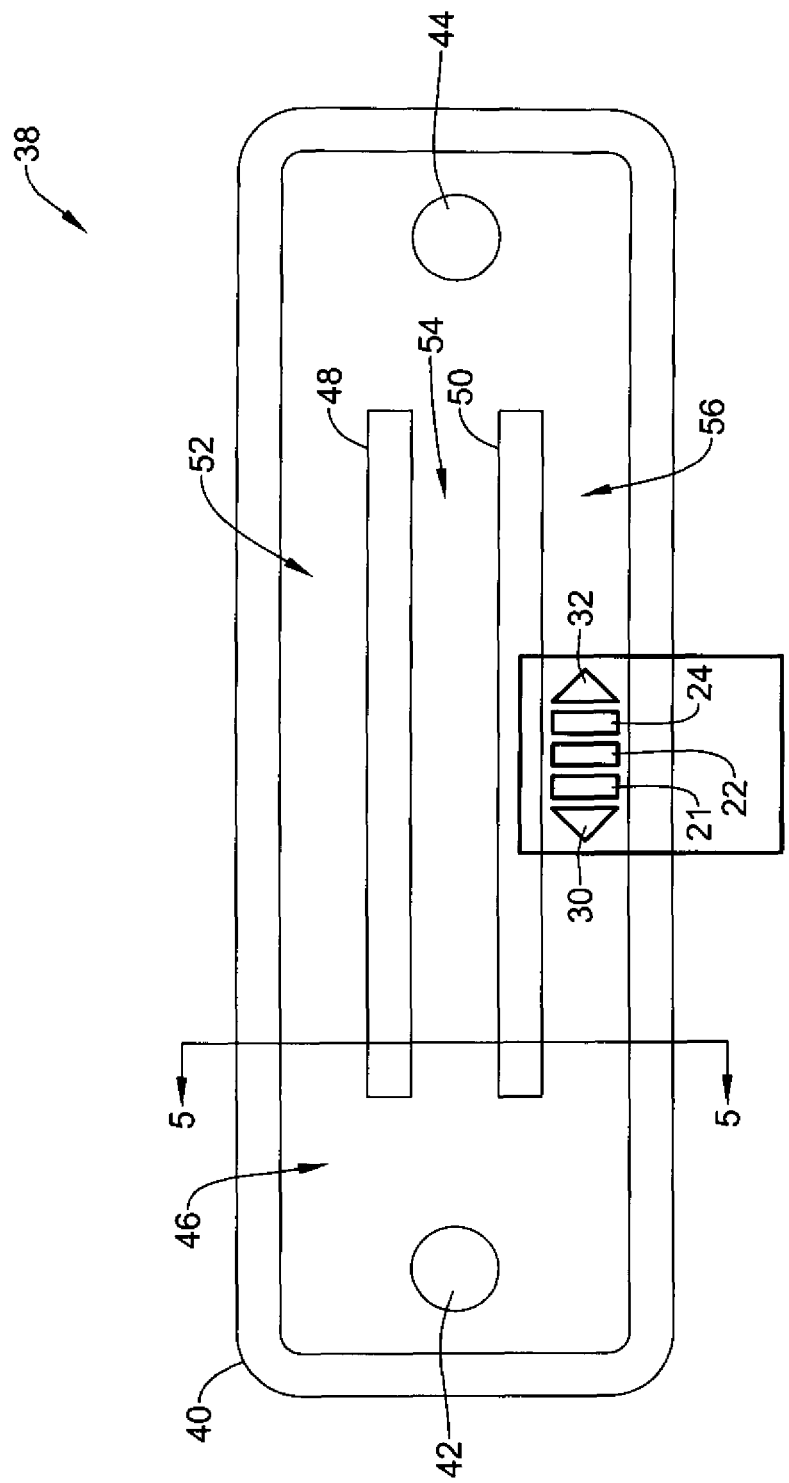
FIG. 4 is a top view of an illustrative packaged thermal flow sensor assembly.

FIG. 3 is a schematic diagram of an illustrative thermal flow sensor assembly for measuring the flow rate of a fluid flow 14 passing through a fluid channel 12. In some cases, thermal flow sensor assembly may be a manifestation of the flow sensor assembly shown in FIG. 3 (or FIG. 2). As shown in FIG. 3, the flow sensor 19 may be a thermal flow sensor (such as, for example, a microbridge flow sensor, a thermal anemometer sensor, a MEMS-based sensor, etc.) for measuring the flow rate of a fluid flow 14 passing through a fluid channel 12. In the illustrative embodiment, the flow sensor 19 includes a substrate 34 defining a sensor channel 26 for receiving at least some of the fluid flowing through fluid channel 12. In some embodiments, the substrate 34 may be a silicon substrate or other substrate, as desired. A layer 28 may be formed on or in the substrate, which may support one or more heating elements, such as heating element 22, and one or more sensor elements, such as sensor elements 21 and 24, for sensing a flow rate of a fluid flow 14 in the channel 26. As illustrated, layer 28 may be fabricated to include openings 30 and 32 for fluidly connecting the sensor channel 26 to the fluid channel 12. In other implementations, the heating element(s) and sensor elements may be disposed directly on a wall of the fluid channel 12 (or on another substrate that is disposed directly on the wall of the fluid channel 12), without an additional sensor channel 26 (e.g., as is shown in FIG. 4). When a fluid flow is present in fluid channel 12, at least some of the fluid flow 14 may flow through opening 30 into the sensor channel 26, across one or more heating elements, such as heating element 22, and one or more sensing elements, such as sensing elements 21 and 24, and through an opening 32 back into the fluid channel 12.

Figure 5:
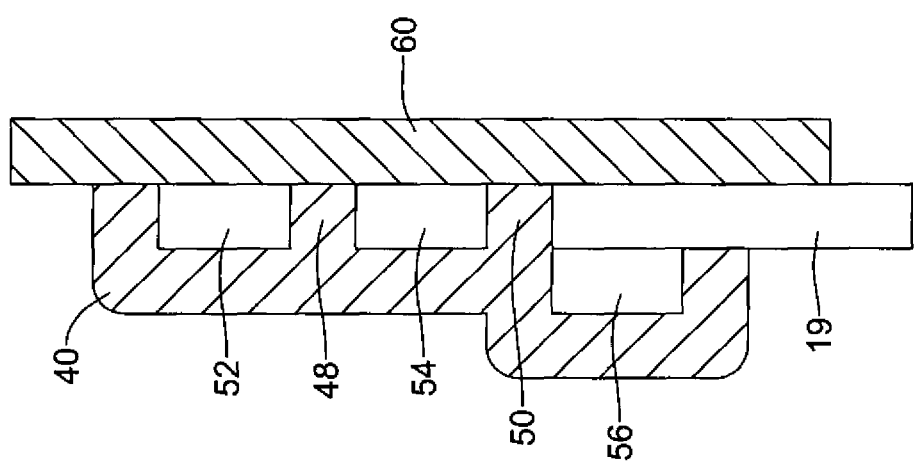
FIG. 5 is a cross-section view of the illustrative packaged thermal flow sensor assembly of FIG. 4 with a top cover.

FIGS. 4 and 5 are top and cross-sectional views of a flow sensor assembly 38. In the illustrative embodiment, the flow sensor assembly 38 may be configured to have an enhanced or an increased flow range, while still having a stable, reliable and repeatable output signal from the flow sensor without experiencing sensor saturation. In fluid dynamics, the mass volumetric flow rate, often specified in SLPM (standard liters per minute), SCCM (standard cubic centimeters per minute), or SCFH (standard cubic feet per hour), is typically related to the flow velocity and the cross-sectional area of the flow channel. Increasing the cross-sectional area of the flow channel may, hence, increase the mass volumetric flow rate (e.g. range and/or sensitivity) of the flow sensor assembly 38.

In some instances, the geometry of the fluid channel can affect the stability of the fluid flow. Reynolds number (Re), which is an index relating to turbulence in the fluid channel, is given by:

$$Re = \rho * V * d / \mu$$

where:
$\rho$ is a fluid density;
V is a mean velocity of flow;
d is a characteristic distance (diameter of hydraulic radius); and
$\mu$ is a viscosity.

Generally, a laminar flow occurs at low Reynolds numbers, where viscous forces may be dominant, and is characterized by smooth, constant fluid motion, while a turbulent flow occurs at high Reynolds numbers and is dominated by inertial forces, which tend to produce chaotic eddies, vortices and other flow instabilities. Laminarizing a fluid flow through the fluid channel can be accomplished by adjusting the geometry of the fluid sub-passages (e.g. diameter of hydraulic radius) to reduce the Reynolds number (Re) of the fluid flow.

In the illustrative embodiment, the flow sensor assembly 38 may include an inlet port 42, and outlet port 44, and a fluid channel 46 extending between the inlet port 42 and the outlet port 44. As shown, the flow sensor assembly 38 can include one or more partitions, such as partitions 48 and 50, in fluid channel 46 to define one or more fluid sub-passages or chambers, shown as sub-passages 52, 54, and 56. In the illustrated example, two partitions 48 and 50 are shown. However, it is contemplated that other numbers of partitions may be used, such as, for example, one or more partitions, two or more partitions, three or more partitions, four or more partitions, five or more partitions, six or more partitions, seven or more partitions, or any other number of partitions, as desired. Likewise, the partitions 48 and 50 are shown as defining three fluid sub-passages 52, 54, and 56. However, it is contemplated that other numbers of fluid sub-passages may be provided, such as, for example, two or more sub-passages, three or more sub-passages, four or more sub-passages, five or more sub-passages, six or more sub-passages, seven or more sub-passages, eight or more sub-passages, or any other number of fluid sub-passages, as desired.

In the illustrative embodiment, each partition 48 and 50 may be configured to have a length, which extends in a direction parallel to the fluid channel 46, which may be greater than a width, which extends in a direction perpendicular to the fluid channel 46. In some instances, the length and width of each partition 48 and 50 may be the same, but in other cases, it is contemplated that the partitions 48 and 50 may have different lengths and/or widths. In the embodiment shown, each of the sub-passages 52, 54 and 56 are fluidly connected to the other sub-passages both upstream and downstream of the partitions 48 and 50, but this is not required. Also, the partitions 48 and 50 fluidly isolated each of the sub-passages 52, 54 and 56 from each other along the length of the partitions 48 and 50, but this is not required in all embodiments. For example, in some cases, the partitions 48 and 50 may be fin type dividers having a height extending only partially across the fluid channel 46 in a direction perpendicular to the fluid flow. With such a configuration, the partitions 48 and 50 may be spaced from the cover 60 (shown in FIG. 5). Also, in some embodiments, the fluid sub-passages 52, 54, and 56 may be configured to have the same or substantially similar cross-sectional area, such that the volume of fluid flowing through each of the fluid sub-passages 52, 54, and 56 may be the same or substantially the same. However, it is contemplated that different cross-sectional areas may be used for the fluid sub-passages 52, 54, and 56, as desired.

In the illustrative embodiment, the partitions 48 and 50 can reduce the turbulence in the fluid passing the flow sensor 19 by reducing the diameter of hydraulic radius and consequently, the Reynolds number of the fluid sub-passage. In some instances, the one or more partitions 48 and 50 may be configured to help laminarize the fluid flow in the fluid channel 46 past the flow sensor 19 by creating a more consistent flow and mitigating turbulent effects of the flow of fluid past the flow sensor 19. In some cases, the laminar flow can reduce the noise seen by the flow sensor 19, providing a more consistent, reliable, repeatable, and stable output of the flow sensor assembly 38.

In the illustrative embodiment, the flow sensor assembly 38 may include a bottom housing member 40 and a top cover 60 (shown in FIG. 5). The top cover 60 may be mounted on or otherwise sealingly engaged to the bottom housing member 40. With such a configuration, the bottom housing member 40 and top cover 60 may define the fluid channel 46 and/or protect the flow sensor 19 and any associated signal conditioning circuitry that may be provided in the flow sensor assembly 38. In some embodiments, the top cover 60 may be a circuit board (e.g. printed circuit board) or substrate having the flow sensor 19 mounted thereon. However, any other suitable cover 60 may be used.

In some embodiments, the bottom housing member 40 may define the inlet port 42, outlet port 44, three or more sides of the fluid channel 46, and partitions 48 and 50, but this is not required. In some cases, the inlet port 42, outlet port 44, three or more sides of the fluid channel 46, and partitions 48 and 50 may be formed from a single part (e.g. a single molded part). In this embodiment, the top cover 60 may define the fourth, or top, side of the fluid channel 46. As shown in FIG. 5, the partitions 48 and 50 may be configured to have a height such that partitions 48 and 50 engage the top cover 60. In some instances, it is contemplated that the top cover 60 may be configured to define all or part of the inlet port 42, outlet port 44, three or more sides of the fluid channel 46, and/or partitions 48 and 50, if desired.

In the illustrative embodiment, the housing, including the bottom housing member 40 and the top cover 60, may be formed as a composite. This may, in some cases, aid in molding the bottom housing member 40 and the top cover 60. However, it is contemplated that the housing may be molded in a single piece from a plastic or other suitable material according to design considerations. For example, it is contemplated that the housing may be formed by injection molding, or may be made by any other suitable methods and materials, as desired. In some cases, the bottom housing member 40 and top cover 60 may be formed from, for example, plastic, ceramic, metal and/or any other suitable material, as desired.

In some embodiments, the inlet port 42 and/or the outlet port 44 may be provided at an angle relative to the fluid channel 46. As shown in FIG. 4, for example, the inlet port 42 and the outlet port 44 may be generally perpendicular to the fluid channel 46. However, other angles are also contemplated, including no angle. In some embodiments, the inlet port 42 and the outlet port 44 may be fluidly coupled to a main flow channel (not shown), but this is not required.

In some instances, the inlet port 42 and/or the outlet port 44 may have a diameter or cross-sectional area that is reduced relative to the fluid channel 46. However, it is contemplated that the inlet port 42 and/or the outlet port 44 may have diameters and/or cross-sectional areas that are about the same as or that are greater than the fluid channel 46, if desired.

In the illustrative embodiment, flow sensor 19 is provided in the fluid channel 46 or, more specifically, in fluid communication with fluid sub-passage 56 of flow sensor assembly 38. When a non-zero fluid flow is present in the fluid channel 46, the fluid may flow through the inlet port 42, through fluid channel 46, through fluid sub-passages 52, 54, and 56, and through outlet port 44. In the illustrative embodiment, at least some of the fluid flowing through fluid sub-passage 56 may enter flow sensor 19 through opening 30, flow over upstream sensing element 21, heating element 22, and downstream sensing element 24, and out of the flow sensor 19 through opening 32. When the heating element 22 is heated to a temperature higher than the ambient temperature of the fluid in the fluid flow, the symmetrical temperature distribution may be disturbed and the amount of disturbance may be related to the flow rate of the fluid flow through fluid sub-passage 56, which may be related to the fluid flow through fluid channel 46. The flow rate of the fluid flow may cause the upstream sensor element 21 to sense a relatively cooler temperature than the downstream sensor element 24 of the illustrative flow sensor 19. In other words, the flow rate of the fluid flow may cause a temperature differential between the upstream sensor element 21 and the downstream sensor element 24, which may be related to the flow rate of the fluid flow in the fluid sub-passage 56, and hence, fluid channel 46. The temperature differential between the upstream sensor element 21 and the downstream sensor element 24 may result in an output voltage differential between the upstream sensor element 21 and the downstream sensor element 24.

In some instances, the flow sensor 19 may not include a separate flow channel that is separate from the fluid sub-passage 56. Rather, in some cases, the flow sensor 19 may directly expose a heating element 22 and one or more sensor elements 21 and 24 directly to the fluid sub-passage 56 to directly measure the flow rate in the fluid sub-passage 56. In other instances, it is contemplated that the flow sensor 19 may measure the mass flow and/or velocity of the fluid flow 14 in the fluid sub-passage 56 using a thermal sensor, pressure sensor, acoustical sensor, optical sensor, pitot tube, and/or any other suitable flow sensor, as desired.

Although not shown, the flow sensor assembly 38 may include one or more electrical leads that are electrically connected to the flow sensor 19, which may extend external to the housing. In some cases, the one or more electrical leads may include a metal, however, any suitable conducting material may be used, as desired.

Figure 6:
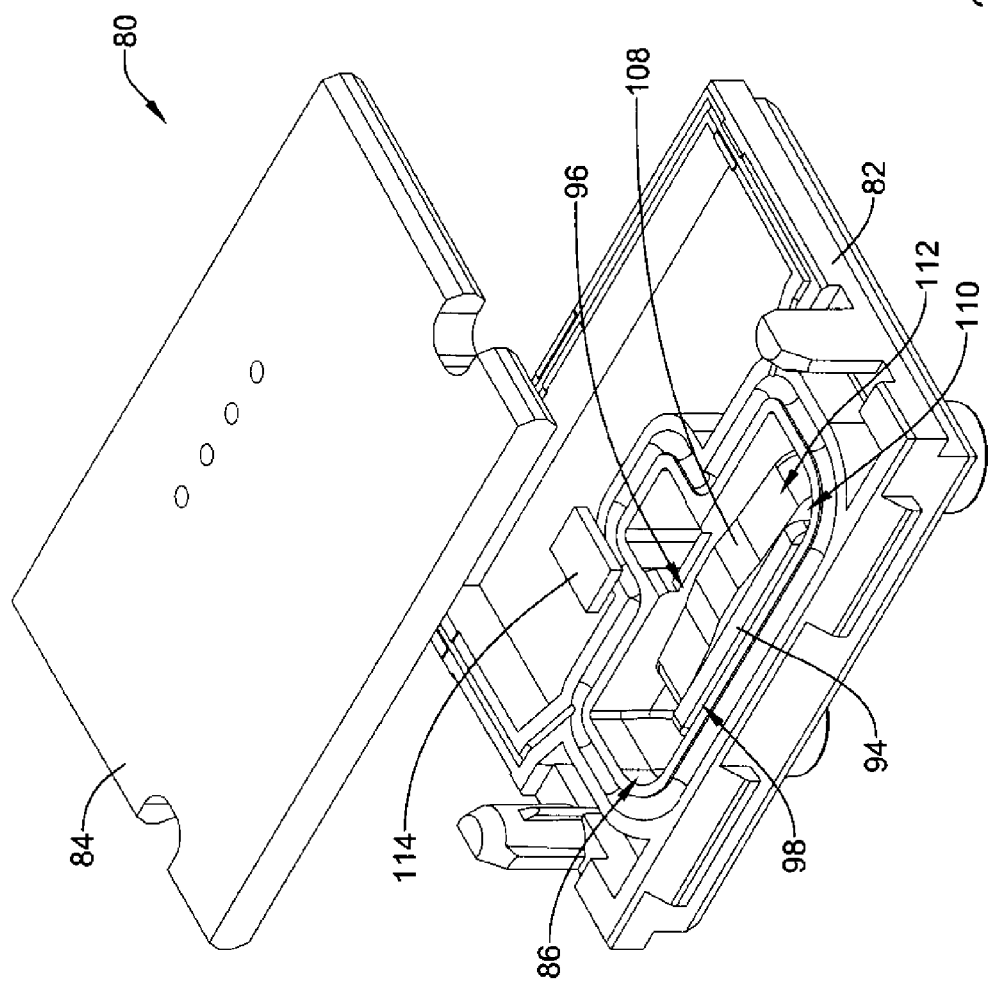
FIG. 6 is an exploded view of another illustrative packaged thermal flow sensor assembly.
Figure 7:
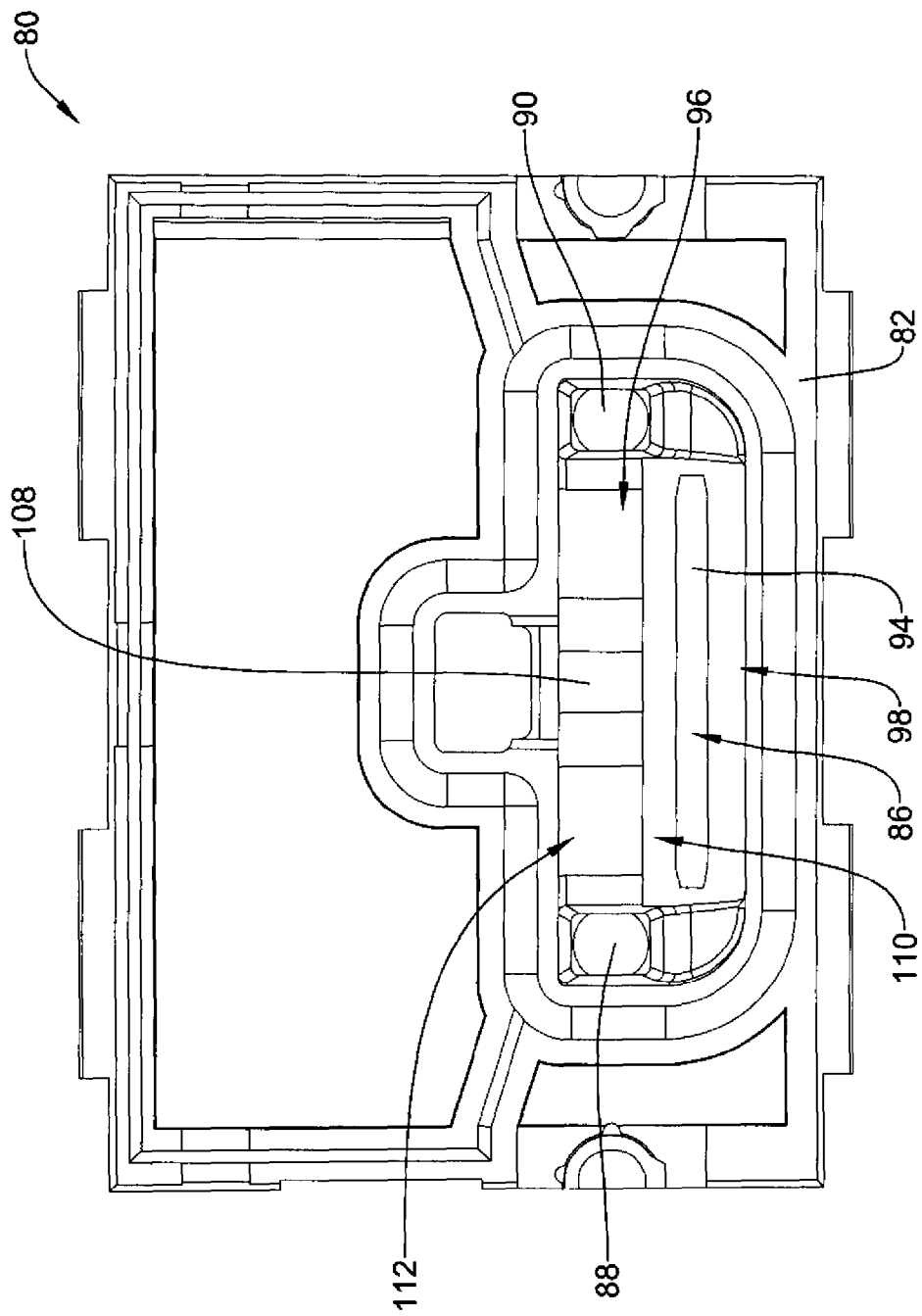
FIG. 7 is a top view of the housing of the illustrative packaged thermal flow sensor assembly of FIG. 6.

FIGS. 6-9 are views of another illustrative flow sensor assembly 80. In the illustrative embodiment, the flow sensor assembly 80 may include a housing 82 and a cover 84. The cover 84 (e.g. printed circuit board) may be configured to be mounted on or otherwise sealingly engaged to the housing 82. With such a configuration, the housing 82 and cover 84 may define the flow channel 86 and/or protect the flow sensor (not shown) and/or any associated signal conditioning circuitry that may be provided in the flow sensor assembly 80. As illustrated in FIGS. 7 and 9, the housing 82 includes an inlet port 88 and an outlet port 90 for exposing the flow channel 86 to a fluid flow. The flow sensor assembly 80 may include a flow sensor 114, which may be similar to flow sensor 19, positioned in or adjacent to the flow channel 86 and configured to sense a rate of fluid flow through the flow channel 86.

Flow sensor assembly may also include one or more partitions, such as partition 94, in flow channel 86 to at least partially define one or more fluid sub-passages or chambers, shown as sub-passages 96 and 98. In the example shown, partition 94 is provided. However, it is contemplated that other numbers of partitions may be used, such as, for example, zero, one or more partitions, two or more partitions, three or more partitions, four or more partitions, five or more partitions, six or more partitions, seven or more partitions, or any other number of partitions, as desired. The partition 94 is shown as defining two fluid sub-passages 96 and 98. However, it is contemplated that other numbers of fluid sub-passages may be provided, such as, for example, two or more sub-passages, three or more sub-passages, four or more sub-passages, five or more sub-passages, six or more sub-passages, seven or more sub-passages, eight or more sub-passages, or any other number of fluid sub-passages, as desired.

Figure 8:
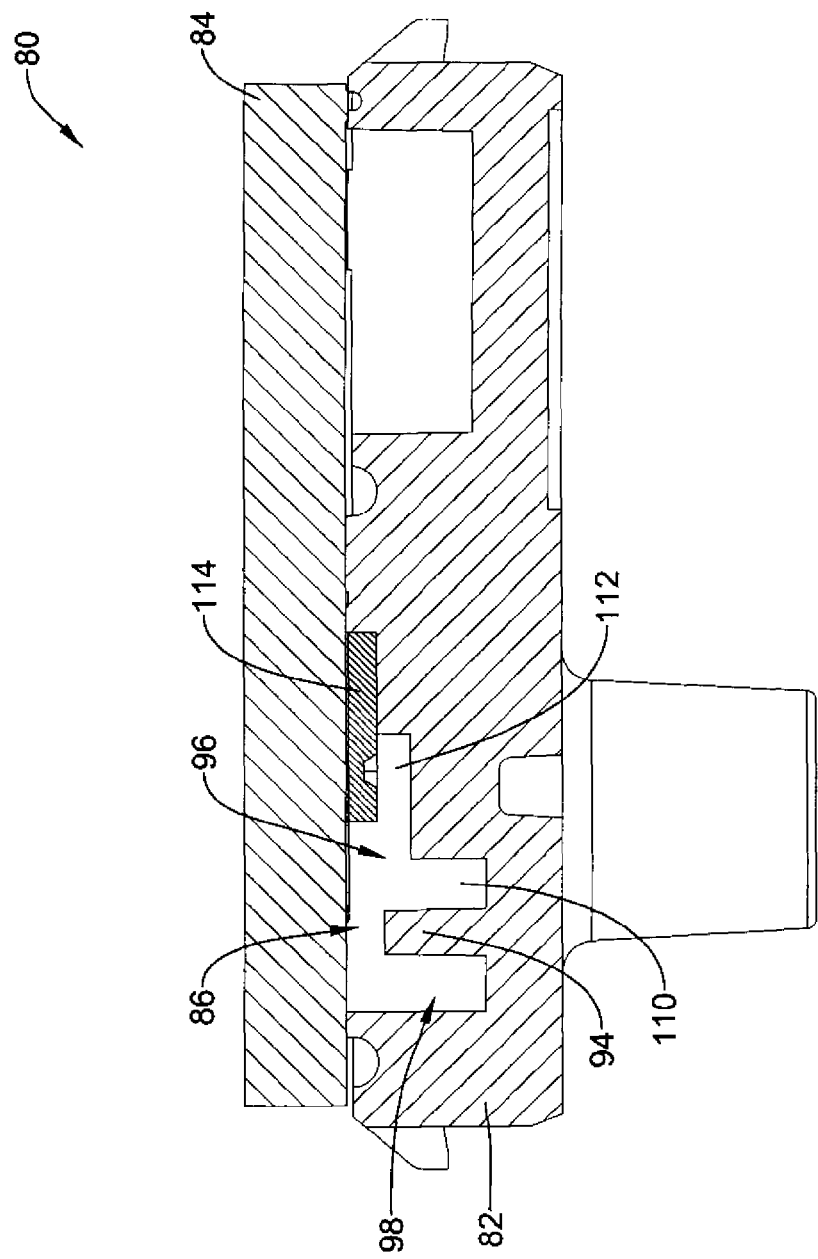
FIG. 8 is a cross-sectional view of the illustrative packaged thermal flow sensor assembly of FIG. 6.

In the illustrative embodiment, partition 94 may be configured to have a length, which extends in a direction parallel to the flow channel 86, which may be greater than a width, which extends in a direction perpendicular to the flow channel 86. In the embodiment shown, each of the sub-passages 96 and 98 are fluidly connected to the other sub-passages both upstream and downstream of the partition 94, but this is not required. Also, the partition 94 may or may not be configured to fluidly isolate each of the sub-passages 96 and 98 from each other along the length of the partition 94. For example, as shown in FIG. 8, the partition 94 may be fin type dividers having a height extending only partially across the flow channel 86 in a direction perpendicular to the fluid flow. With such a configuration, the partition 94 may be spaced from the cover 84. However, it is contemplated that partition 94 may extend entirely across the flow channel 86 in a direction perpendicular to the fluid flow to fluid isolate sub-passages 96 and 98.

In the illustrative embodiment, the partition 94 can help reduce the turbulence in the fluid passing through the flow channel 86 by reducing the diameter of hydraulic radius and consequently, the Reynolds number of the fluid sub-passage. In some instances, the one or more partitions 94 may be configured to help laminarize the fluid flow in the flow channel 86 by creating a more consistent flow and mitigating turbulent effects of the flow of fluid. In some cases, the laminar flow can reduce the noise seen by the flow sensor 114, providing a more consistent, reliable, repeatable, and stable output of the flow sensor assembly 80.

As shown, sub-passage 98 may be configured to have a relatively constant height (direction perpendicular to the fluid flow and extending between housing 82 and cover 84) along the length of sub-passage 98. Sub-passage 96 may be configured to have a first portion 110 and a second portion 112. The first portion 110 may be configured to have a height that is substantially similar to the height of sub-passage 98 and second portion 112 may be configured to have a height that is less than the height of the first portion 110 and sub-passage 98. In some cases, the width (direction perpendicular to the fluid flow and perpendicular to the height) of the second portion 112 may be greater than the width of the first portion 110, but this is not required. Sub-passages 96 and 98 and/or partition 94 may be configured to have the same or substantially similar cross-sectional area to promote a substantially uniform fluid (e.g. air) velocity through the flow channel 86. That is, sub-passage 96 may be configured to promote the same or substantially similar fluid (e.g. air) velocity in the fluid flow as sub-passage 98. However, it is contemplated that sub-passages 96 and 98 may be configured to have different cross-sectional areas or fluid velocity flow therethrough.

In some embodiment, the flow sensor 114 may be positioned to sense the fluid flowing across the second portion 112 of sub-passage 96. In some instances, to facilitate fluid flow through the flow sensor 114, the second portion 112 of sub-passage 96 may include a boss 108 or other feature configured to direct the fluid through the flow sensor 114. For example, boss 108 may include a first taper reducing the cross-sectional area of the bypass channel 92 and a second taper increasing the cross-sectional area of the bypass channel 92. In some cases, the flow sensor 114 can be positioned between the first taper and the second taper, but this is not required.

As shown in FIG. 8, which is a cross-section of the flow channel 86, the flow channel 86 may be arranged such that sub-passage 98 is to the left of partition 94 and sub-passage 96 is to the right of partition 94. Within sub-passage 96, the first portion 110 may be positioned on the left side of the second portion 112. It is contemplated that other arrangements may also be used. For example, the first portion 110 may be positioned on the right side of the second portion 112 and/or sub-passages 96 and 98 may be positioned on opposite sides, if desired. Furthermore, the relative terms "right" and "left" are used for mere illustrative purposes and are not meant to be limiting in any manner.

In some instances, the second portion 112 of sub-passage 96 may be positioned to extend along a line extending between inlet port 88 and outlet port 90, when the first portion 110 of sub-passage 96 and the second sub-passage 98 may be positioned offset from the line extending between the inlet port 88 and the outlet port 90, but this is not required.

In some embodiments, the housing 82 may define the inlet port 88, outlet port 90, three or more sides of the flow channel 86, and partition 94, but this is not required. In some cases, the inlet port 88, outlet port 90, three or more sides of the flow channel 86, and partition 94 (when provided) may be formed from a single part (e.g. a single molded part). In such an embodiment, the cover 84 may define the fourth, or top, side of the flow channel 86. As shown in FIG. 6, the partition 94 may be configured to have a height such that partition 94 does not engage the cover 84. However, it is contemplated that partition 94 may be configured to have a height such that partition 94 engages the cover 84, if desired.

In the illustrative embodiment, the housing 82 and the cover 84, may be formed as a composite. This may, in some cases, aid in molding the housing 82 and the cover 84. However, it is contemplated that the housing 82 and cover 84 may be molded in a single piece from a plastic, ceramic, metal or any other suitable material according to design considerations. It is also contemplated that the housing may be formed by injection molding, or may be made by any other suitable methods and materials, as desired. In some cases, the cover 84 may be a printed circuit board or other substrate having the flow sensor 114 mounted thereon, but this is not required.

In some embodiments, the inlet port 88 and/or the outlet port 90 may enter at an angle relative to the flow channel 86. As shown in FIG. 7, for example, the inlet port 88 and the outlet port 90 may be generally perpendicular (angle=90 degrees) to the flow channel 86. However, other angles are also contemplated, including no angle (in-plane with the flow channel 86). In some embodiments, the inlet port 88 and the outlet port 90 may be fluidly coupled to a main flow channel (not shown) of a larger system (such as a respirator), but this is not required.

Although not shown, the flow sensor assembly 80 may include one or more electrical leads that are electrically connected to the flow sensor 114, which may extend external to the housing. In some cases, the one or more electrical leads may include a metal, however, any suitable conducting material may be used, as desired.

Having thus described the several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor assembly, comprising:
   a housing including an inlet flow port, an outlet flow port, and a fluid channel extending between the inlet flow port and the outlet flow port, the housing including one or more partitions positioned in the fluid channel to define two or more fluid sub-passages through the fluid channel, wherein the one or more partitions are positioned in the fluid channel to provide cross-sectional areas for each of the two or more fluid sub-passages such that a volume of fluid flow through each of the two or more fluid sub-passages is substantially the same, wherein the two or more fluid sub-passages are configured to laminarize the fluid flow; and
   a flow sensor in fluid communication with one of the two or more fluid sub-passages of the fluid channel, the flow sensor configured to sense a measure related to a flow rate of a fluid flowing through the corresponding fluid sub-passage, which is related to the flow rate of the fluid flowing through the fluid channel.

2. The flow sensor assembly of claim 1, wherein the one or more partitions have a length extending in a direction parallel to the fluid flow and a width extending in a direction perpendicular to the fluid flow, wherein the length is greater than the width.

3. The flow sensor assembly of claim 1, wherein the cross-sectional area of the two or more fluid sub-passages are substantially the same.

4. The flow sensor assembly of claim 1, wherein the inlet flow port and outlet flow port are substantially perpendicular to the fluid channel.

5. The flow sensor assembly of claim 1, wherein the cross-sectional area of the inlet flow port and the outlet flow port is smaller than the cross-sectional area of the fluid channel.

6. The flow sensor assembly of claim 1, wherein the flow sensor includes a heating element, a first sensing element positioned upstream of the heating element, and a second sensing element positioned downstream of the heating element.

7. The flow sensor assembly of claim 1, wherein the housing includes a single molded part.

8. A flow sensor assembly, comprising:
   a housing including an inlet flow port, an outlet flow port, and a fluid channel extending between the inlet flow port and the outlet flow port, the housing including one or more partitions positioned in the fluid channel to define two or more fluid sub-passages through the fluid channel, wherein the one or more partitions are configured to promote a substantially uniform fluid velocity in a fluid flowing through the two or more fluid sub-passages and are configured to laminarize the fluid flowing through the two or more fluid sub-passages; and
   a flow sensor in fluid communication with one of the two or more fluid sub-passages of the fluid channel, wherein the flow sensor is configured to sense a measure related to a flow rate of a fluid flowing through the corresponding fluid sub-passage, which is related to the flow rate of the fluid flowing through the fluid channel.

9. The flow sensor assembly of claim 8, wherein the one or more partitions are configured to provide cross-sectional areas for each of the two or more fluid sub-passages such that a volume of fluid flow through each of the two or more fluid sub-passages is substantially the same.

10. The flow sensor assembly of claim 8, wherein the one or more partitions have a length extending in a direction parallel to the fluid flow and a width extending in a direction perpendicular to the fluid flow, wherein the length is greater than the width.

11. The flow sensor assembly of claim 8, wherein the inlet flow port and outlet flow port are substantially perpendicular to the fluid channel.

12. The flow sensor assembly of claim 8, wherein the flow sensor includes a heating element, a first sensing element positioned upstream of the heating element, and a second sensing element positioned downstream of the heating element.

13. The flow sensor assembly of claim 8, wherein the housing includes a single molded part.

14. The flow sensor assembly of claim 13, further comprising a top cover mounted on the housing.

15. A flow sensor assembly, comprising:
- a single piece molded housing including an inlet flow port and an outlet flow port, wherein the molded housing defines at least a portion of a fluid channel extending between the inlet flow port and the outlet flow port, the molded housing further defining one or more partitions positioned in the fluid channel to form two or more fluid sub-passages through the fluid channel, wherein the two or more fluid sub-passages are configured to laminarize the fluid flow;
- a top cover mounted to the molded housing, wherein the top cover is configured to define at least one surface of the fluid channel, wherein the one or more partitions of the molded housing extend toward the top cover and have a height such that the one or more partitions are spaced from the top cover; and
- a flow sensor in fluid communication with one of the two or more fluid sub-passages of the fluid channel, the flow sensor configured to sense a measure related to a flow rate of a fluid flowing through the corresponding fluid sub-passage, which is related to the flow rate of the fluid flowing through the fluid channel.

16. The flow sensor assembly of claim 15, wherein the one or more partitions are configured to provide substantially uniform cross-sectional areas to each of the two or more fluid sub-passages.

17. The flow sensor assembly of claim 15, wherein the inlet flow port and outlet flow port substantially perpendicular to the fluid channel.

18. The flow sensor assembly of claim 15, wherein the flow sensor includes a heating element, a first sensing element positioned upstream of the heating element, and a second sensing element positioned downstream of the heating element.

* * * * *